Patented June 30, 1925.

1,544,532

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

PROCESS OF MAKING CHLORINATED RUBBER.

No Drawing.      Application filed March 22, 1924. Serial No. 701,030.

*To all whom it may concern:*

Be it known that I, CARLETON ELLIS, a citizen of the United States, and a resident of Montclair, in the county of Essex and State of New Jersey, have invented certain new and useful Improvements in Processes of Making Chlorinated Rubber, of which the following is a specification.

This application is a continuation in part of co-pending application Serial No. 487,784, filed July 26, 1921. The invention relates to a process of chlorinating rubber and to the products thereof, and relates especially to a method of chlorinating rubber by exposing solid rubber to the action of chlorine in the presence of a regulated amount of a solvent vehicle.

Rubber is soluble with difficulty in solvents such as benzol and the like, and a comparatively small amount of rubber suffices when thoroughly dissolved to make a very viscous solution. Chlorinating such a solution involves considerable expense as regards evaporation of solvent, etc., in order to produce a concentrated solution of chlorinated rubber or the solid itself. In the present invention one phase of procedure is the treatment of a suspension of rubber in a solvent medium. For example by agitating fragments of rubber in a rubber solvent and passing chlorine therethrough, the rubber will become chlorinated at the surface of the fragments and will dissolve in the solvent. While raw rubber dissolves very slowly in so-called rubber solvents, the chlorinated rubber is relatively soluble, and dissolves easily and rapidly, as fast as formed. Therefore, by agitating sheets or fragments of rubber in the presence of a suspensory vehicle, preferably a volatile solvent which is a good solvent for chlorinated rubber, the raw rubber will be softened at the surface by the action of the solvent and agitation; the solvent being saturated with chlorine, such chlorine will chlorinate the softened rubber at the surface of each fragment, and the chlorinated rubber thus formed will promptly dissolve in the solvent.

With a given body of solvent or suspensory vehicle, the entire batch of rubber to be chlorinated may be added at once or in portions. Vigorous agitation is desirable, and as an object of the invention is to be able to obtain concentrated solutions of chlorinated rubber without the necessity of removing solvent by evaporation, it is desirable to have the agitating device sufficiently strong to handle highly viscous solutions of the resulting chlorinated rubber. It is preferable, in adding rubber fragments to the suspensory vehicle, that the amount introduced at any one time be not so great as to cause the fragments to come into such intimate contact that they will cohere and form large masses. Should this result, the surface exposed to the action of chlorine would be much reduced, causing a corresponding increase in the time necessary for the reaction.

As a solvent, carbon tetrachloride may be used to advantage, as this is not affected by chlorine. Benzol, toluene and similar hydrocarbons of the benzol type may also be used, in cases where the presence of chlorination products of these is not objectionable. Chloroform or trichlorethylene may also be utilized.

The chlorine employed may be liquid chlorine, or chlorine from electrolyzing salt and containing more or less air or oxygen or hydrogen. A certain amount of bromine or iodine may be added, or bromine gas or liquid bromine may be used by itself without any chlorine.

Although chlorination of rubber takes place if the temperature of the liquid is kept low, as described in Serial No. 487,784, also Peachey, U. S. Patent 1,234,381, and the lower chlorinated grades are readily formed, it is difficult to produce highly chlorinated varieties under these conditions. The formation of the very highly chlorinated grades, containing 67% or more of combined chlorine, is greatly facilitated by elevation of the temperature. Temperatures ranging from 40° or 50° C. nearly up to the boiling point of carbon tetrachloride may profitably be employed. In such cases suitable condensing apparatus should be provided in connection with the chlorinating vessel, in order to prevent undue loss of the solvent through evaporation. When it is desired to make the less highly chlorinated kinds of chlorinated rubber, the use of elevated temperatures is advantageous in that it shortens the time required.

Exposure to sunlight or actinic light, may be employed to assist the chlorination. Iodine or other chlorination catalysts may also be utilized for this purpose.

The products formed by this process are light-colored, more or less tough solids. When solutions of them are allowed to evaporate in thin layers, the films resulting are hard and glossy. The highly chlorinated varieties are more brittle than the less chlorinated forms.

If it is desired to obtain the solid chlorinated rubber free from solvents, the solution may be evaporated, or the solvent may be distilled in a current of steam. Another method of separating the solid from the solution consists in adding substances which will precipitate the chlorinated rubber. Examples of these are alcohols, gasoline, acetic acid, etc.

Chlorination of rubber, which involves substitution of chlorine in the molecule, always gives rise to hydrogen chloride as a by-product. When chlorinated rubber is to be used in the solution formed during the chlorination process, it is necessary to eliminate this hydrochloric acid, as well as any excess chlorine. This may be accomplished by boiling the solution, or preferably by neutralizing by means of lime ammonia, or the like. The solid products formed may be allowed to settle, or may be removed in any other suitable way.

An example of the method in which this invention may be carried out is as follows:

125 parts of crêpe rubber cut into small pieces, was added in three portions to about 2,000 parts of carbon tetrachloride, (some of which solvent was lost by evaporation during the process). 2 parts of iodine were initially added as a catalyst and the apparatus was constructed of lead, which prevented the access of light. Chlorine was passed through the liquid, which was kept well agitated. The chlorinating vessel was heated by means of a water jacket, the temperature of the contents ranging from 45° to 55° C. As each portion of rubber chlorinated and dissolved, the next portion was added. Hydrogen chloride was evolved throughout the reaction. When the chlorination was complete, the solvent was evaporated by heating at slightly over 100° C. A light yellow, fluffy solid remained, of a considerable degree of toughness and readily soluble in benzol, ethyl acetate, etc.

While this invention is concerned primarily with the chlorination of rubber suspended in a heated solvent it does not preclude the use of rubber in more or less complete solution before chlorination, the chlorine being passed through the heated solution.

In the foregoing and in the appended claims, the chlorination of rubber is referred to but it is to be understood that the use of bromine or other halogens along with chlorine in a similar or analogous process making a chlorinated product also having other halogens in combination is not precluded. Likewise, in place of natural rubber, artificial rubber may be employed in some cases as a basis for halogenation; or gutta percha, balata, etc, may be utilized.

No claim is made herein on the treatment of vulcanized rubber, such material does not give the highly chlorinated products obtainable when treating unvulcanized rubber.

What I claim is:—

1. A process of chlorinating rubber which comprises treating a suspension of unvulcanized rubber in a solvent vehicle, with chlorine, the amount of such rubber being greatly in excess of the amount which could be dissolved in the amount of such solvent vehicle present and agitating such suspension; said process being carried out at above room temperature but below the boiling point of said vehicle.

2. In making chlorinated rubber, the improvement which comprises reacting upon fragments of unvulcanized rubber, in a volatile liquid medium in which chlorinated rubber is soluble, the said rubber being present in an amount which could not be dissolved in said liquid medium, said step being conducted at substantially above normal room temperature, but at substantially below the boiling point of said liquid medium.

3. A process which comprises incorporating substantially more unvulcanized rubber in a bulk of solvent material than could be dissolved therein, and agitating such mixture of materials at substantially above room temperature but below the boiling point of the solvent, while contacting chlorine therewith.

4. A process which comprises incorporating solid unvulcanized rubber with a solvent vehicle, the latter being present in amount far less than would dissolve said rubber, adding a catalyst, introducing chlorine gas and agitating, said treatment with chlorine being carried out at above room temperature but at substantially below the boiling point of such solvent vehicle.

CARLETON ELLIS.